(12) United States Patent
Shibata

(10) Patent No.: US 9,288,826 B2
(45) Date of Patent: Mar. 15, 2016

(54) WIRELESS COMMUNICATION DEVICE

(71) Applicant: BROTHER KOGYO KABUSHIKI KAISHA, Nagoya-shi, Aichi-ken (JP)

(72) Inventor: Hiroshi Shibata, Obu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 397 days.

(21) Appl. No.: 13/754,712

(22) Filed: Jan. 30, 2013

(65) Prior Publication Data

US 2013/0196702 A1 Aug. 1, 2013

(30) Foreign Application Priority Data

Jan. 31, 2012 (JP) .................................. 2012-019089

(51) Int. Cl.
*H04W 76/02* (2009.01)
*H04N 1/00* (2006.01)
*H04W 88/04* (2009.01)
(Continued)

(52) U.S. Cl.
CPC ........... *H04W 76/02* (2013.01); *H04N 1/00307* (2013.01); *G06F 3/1236* (2013.01); *G06F 3/1292* (2013.01); *H04N 2201/0036* (2013.01); *H04N 2201/0041* (2013.01); *H04N 2201/0055* (2013.01); *H04N 2201/0082* (2013.01); *H04W 76/023* (2013.01); *H04W 84/20* (2013.01); *H04W 88/04* (2013.01)

(58) Field of Classification Search
CPC ..... H04B 7/0413; H04B 3/36; H04W 76/023; H04W 84/20; H04W 28/16; H04W 76/02

USPC ....................................... 455/509, 450, 450.1
See application file for complete search history.

(56) References Cited

U.S. PATENT DOCUMENTS

2006/0274355 A1* 12/2006 Ferlitsch et al. ............. 358/1.15
2011/0225305 A1    9/2011 Vedantham et al.
(Continued)

FOREIGN PATENT DOCUMENTS

JP    2010-533435 A    10/2010
JP    2011-244151 A    12/2011
(Continued)

OTHER PUBLICATIONS

U.S. Office Action issued in related U.S. Appl. No. 13/754,643, mailed Oct. 6, 2014.
(Continued)

*Primary Examiner* — George Eng
*Assistant Examiner* — Fatuma Sherif
(74) *Attorney, Agent, or Firm* — Merchant & Gould P.C.

(57) ABSTRACT

A wireless communication device may establish a first type of connection by using a first wireless channel and establish a second type of connection by using a second wireless channel. In a specific situation where one connection of the first type of connection with the first device and the second type of connection with the second device is to be established, while the other connection has been established, the wireless communication device may form a multiple connection state where both the first and second types of connections are established in a first case where values of the first and second wireless channels are identical, and form a single connection state where one of the first and second types of connections is established in a second case where the values of the first and second wireless channels are not identical.

21 Claims, 8 Drawing Sheets

(51) Int. Cl.
*H04W 84/20* (2009.01)
*G06F 3/12* (2006.01)

(56) References Cited

U.S. PATENT DOCUMENTS

| | | | |
|---|---|---|---|
| 2011/0261389 A1* | 10/2011 | Ohara | 358/1.15 |
| 2011/0280152 A1 | 11/2011 | Saito et al. | |
| 2012/0134349 A1* | 5/2012 | Jung et al. | 370/338 |
| 2013/0195093 A1 | 8/2013 | Shimada | |

FOREIGN PATENT DOCUMENTS

| | | |
|---|---|---|
| JP | 2012-019487 | 1/2012 |
| JP | 2013-519255 A | 5/2013 |
| WO | 2009/009384 A1 | 1/2009 |
| WO | 2011/096746 A2 | 8/2011 |

OTHER PUBLICATIONS

Wi-Fi Alliance, "Wi-Fi Alliance Technical Committee P2P Task Group: Wi-Fi Peer-to-Peer (P2P) Technical Specification," Version 1.1, 2010 (concise explanation of relevance incorporated into specification at Para. [0016]).
U.S. Office Action issued in related U.S. Appl. No. 13/754,643, mailed May 7, 2015.
Office Action issued in Japanese Patent Application No. 2012-019087, mailed Nov. 4, 2015.
U.S. Notice of Allowance issued in related U.S. Appl. No. 13/754,643, mailed Nov. 10, 2015.
Office Action issued in related Japanese application No. 2012-019089, Nov. 27, 2015.

* cited by examiner

WIRELESS COMMUNICATION DEVICE

CROSS-REFERENCE TO RELATED APPLICATIONS

This application claims priority to Japanese Patent Application No. 2012-019089, filed on Jan. 31, 2012, the contents of which are hereby incorporated by reference into the present application.

TECHNICAL FIELD

A technique disclosed in the present specification relates to a wireless communication device.

DESCRIPTION OF RELATED ART

Wi-Fi Direct (called "WFD" below) formulated by Wi-Fi Alliance is known. A WFD wireless network includes one apparatus operating as a Group Owner (called "G/O apparatus" below), and one or more apparatuses operating as a client administered by the G/O apparatus (called "client apparatus" below). In a case where a connection according to the WFD is to be established between a pair of apparatuses, each of the pair of apparatuses executes a G/O negotiation, and determines whether it is to operate as the G/O or the client.

SUMMARY

The present specification presents a technique that, in a state where a wireless communication device is to establish connections with a plurality of devices, allows the wireless communication device to form an appropriate connection state.

One aspect disclosed in the present specification may be a wireless communication device configured to operate selectively in one of a plurality of states comprising a parent station state which functions as a parent station of a wireless network and a child station state which functions as a child station of the wireless network. The wireless communication device may comprise: a processor; and a memory storing computer-readable instructions therein. The computer-readable instructions, when executed by the processor, may cause the wireless communication device to perform: (A) executing a state determination process of determining that one of the wireless communication device and another device is to operate in the parent station state and determining that the other of the wireless communication device and the other device is to operate in the child station state, so as to establish a first type of connection with the other device such that the wireless communication device operates in a state determined in the state determination process, wherein in a case where the first type of connection with a first device is to be established, the first type of connection with the first device may be established by using a first wireless channel; and (B) establishing a second type of connection with another device, wherein in a case where the second type of connection with a second device different from the first device is to be established, the second type of connection with the second device may be established by using a second wireless channel. In a specific situation in which one connection of the first type of connection with the first device and the second type of connection with the second device is to be established, while the other connection of the first type of connection with the first device and the second type of connection with the second device has been established, the above (A) and the above (B) may include: forming a multiple connection state in a first case where a value of the first wireless channel and a value of the second wireless channel are identical, the multiple connection state being a state in which both the first type of connection with the first device and the second type of connection with the second device are established; and forming a single connection state in a second case where the value of the first wireless channel and the value of the second wireless channel are not identical, the single connection state being a state in which one particular connection is established, the one particular connection being one connection of the first type of connection with the first device and the second type of connection with the second device.

Moreover, a control method, a computer program, and a non-transitory computer-readable medium that stores computer-readable instructions, all for realizing the wireless communication device, are also novel and useful.

EMBODIMENT

First Embodiment

Configuration of System

Figure 1:
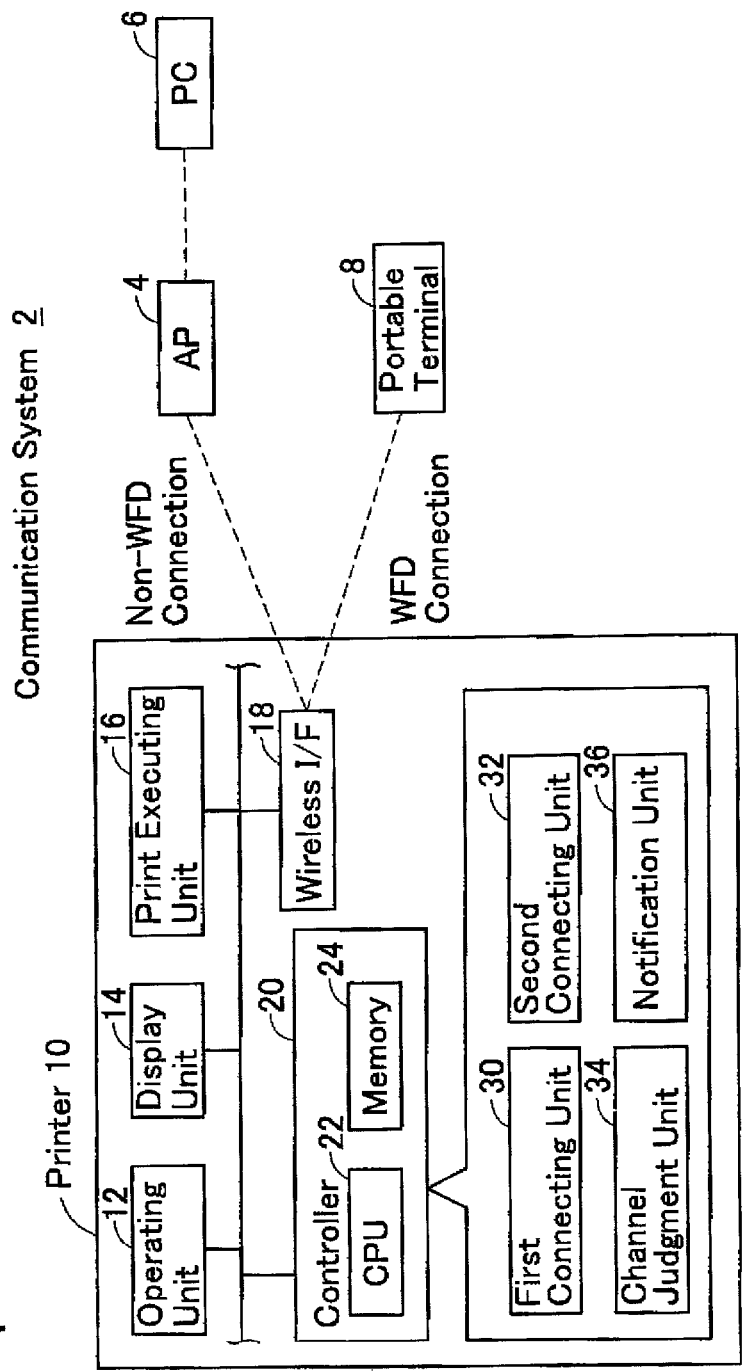
FIG. 1 shows an example of the configuration of a communication system.

As shown in FIG. 1, a communication system 2 comprises an access point (called "AP" below) 4, a PC 6, a portable terminal 8, and a printer 10 (a peripheral apparatus of the PC 6, the portable terminal 8, etc.). The portable terminal 8 and the printer 10 are each capable of executing a wireless communication function in accordance with Wi-Fi Direct (to be described). Moreover, below, Wi-Fi Direct is called "WFD", and a connection in accordance with WFD is called a "WFD connection". The printer 10 is capable of establishing a WFD connection with the portable terminal 8, thereby constructing a WFD network. Consequently, the portable terminal 8 and the printer 10 become capable of wirelessly communicating object data that is a communication object such as print data, etc.

In addition to the wireless communication function in accordance with the WFD, the printer 10 is capable of executing a normal wireless communication function (e.g., wireless communication according to IEEE802.11). That is, the printer 10 is capable of establishing a connection with the AP 4 (called "non-WFD connection" below), thereby constructing a non-WFD network. Moreover, the PC 6 is also capable of establishing a non-WFD connection with the AP 4. Consequently, the printer 10 and the PC 6 become capable of wirelessly communicating the object data that is the communication object such as the print data, etc. via the AP 4.

In the present embodiment, a state is assumed in which the AP 4, the PC 6 and the printer 10 are stationary within, for example, a specific company. That is, a non-WFD network that includes the AP 4, the PC 6 and the printer 10 is constructed in the specific company. Consequently, a user of the PC 6 (e.g. an employee of the specific company) can execute printing on the printer 10 via the AP 4. A user of, for example, the portable terminal 8 (e.g. a visitor to the specific company) can temporarily establish the WFD connection between the portable terminal 8 and the printer 10. That is, the user of the portable terminal 8 can temporarily construct a WFD network that includes the portable terminal 8 and the printer 10. Thereby, the user of the portable terminal 8 can execute printing on the printer 10 without going through the AP 4. Thus, in the present embodiment, a state is assumed in which the non-WFD network is a network that is to remain constructed constantly, and the WFD network is a network that is to be constructed temporarily.

(Configuration of Printer 10)

The printer 10 comprises an operating unit 12, a display unit 14, a print executing unit 16, a wireless interface 18, and a controller 20. The units 12 to 20 are connected with a bus line (reference number omitted). The operating unit 12 includes a plurality of keys. The user can give various instructions to the printer 10 by operating the operating unit 12. The display unit 14 is a display for displaying various information. The print executing unit 16 comprises a printing mechanism such as an ink jet method, laser method, etc. printing mechanism, and executes printing according to an instruction from the controller 20.

The wireless interface 18 is an interface used when the controller 20 executes a wireless communication. The wireless interface 18 is physically one interface. However, a MAC address to be used in the WFD connection and a MAC address to be used in the non-WFD connection are both assigned to the wireless interface 18. Consequently, by using the wireless interface 18, the controller 20 may simultaneously execute both the wireless communication function in accordance with WFD and the normal wireless communication function. Consequently, as will be described in detail later, the controller 20 may form a state in which both the WFD connection and the non-WFD connection have been established.

The controller 20 comprises a CPU 22 and a memory 24. The CPU 22 executes various processes according to programs stored in the memory 24. The memory 24 comprises a ROM, RAM, hard disk, etc. The memory 24 stores the programs executed by the CPU 22, and stores data acquired or created in the course of the CPU 22 performing processes. The CPU 22 realizes the functions of a first connecting unit 30, a second connecting unit 32, a channel judgment unit 34, and a notification unit 36 by executing processes according to the programs.

As will be described in detail later, the first connecting unit 30 is a unit for executing the wireless communication function in accordance with WFD. For example, the first connecting unit 30 establishes a WFD connection with the portable terminal 8. Further, the second connecting unit 32 is not a unit for executing the wireless communication function in accordance with WFD, but is a unit for executing the normal wireless communication function. For example, the second connecting unit 32 establishes a non-WFD connection with the AP 4.

(Configuration of PC 6)

The PC 6 is not capable of executing a wireless communication function in accordance with the WFD. However, in a variant, the PC 6 may be capable of executing the wireless communication function in accordance with the WFD. The PC 6 can establish the non-WFD connection with the AP 4. The PC 6 comprises a CPU, memory, display, etc. (not shown). The memory of the PC 6 stores a printer driver program for the printer 10. The CPU of the PC 6 can create print data that is a printing object by using the printer driver program. In a state where the non-WFD connection has been established between the printer 10 and the AP 4, and the non-WFD connection has also been established between the PC 6 and the AP 4, the PC 6 can wirelessly send the print data to the printer 10 via the AP 4.

(Configuration of Portable Terminal 8)

The portable terminal 8 is a portable terminal including, for example, a Smart Phone, PDA terminal, notebook PC, tablet PC, etc. The portable terminal 8 is capable of executing a wireless communication function in accordance with the WFD. The portable terminal 8 is capable of establishing the WFD connection with the printer 10. The portable terminal 8 comprises a CPU, memory, display, etc. (not shown). The memory of the portable terminal 8 stores a printer driver program for the printer 10. The CPU of the portable terminal 8 can create the print data that is a printing object by using the printer driver program. In state where the WFD connection has been established between the printer 10 and the portable terminal 8, the portable terminal 8 can wirelessly send the print data to the printer 10 without going through the AP 4.

(WFD)

The WFD is a standard formulated by Wi-Fi Alliance. The WFD is described in "Wi-Fi Peer-to-Peer (P2P) Technical Specification Version1.1" created by Wi-Fi Alliance.

As described above, the printer 10 and the portable terminal 8 are each capable of executing the wireless communication function in accordance with the WFD. Below, an apparatus capable of executing the wireless communication function in accordance with the WFD is called a "WFD-compatible apparatus". According to the WFD standard, three states are defined as the states of the WFD-compatible apparatus: Group Owner state (called "G/O state" below), client state, and device state. The WFD-compatible apparatus is capable of selectively operating in one state among the three states.

One WFD network includes an apparatus in the G/O state and an apparatus in the client state. Only one G/O state apparatus may be present in one WFD network, but one or more client state apparatuses may be present. The G/O state apparatus manages the one or more client state apparatuses. Specifically, the G/O state apparatus creates an administration list in which identification information (i.e., MAC address) of each of the one or more client state apparatuses is written. When a client state apparatus newly participates in the WFD network, the G/O state apparatus adds the identification information of that apparatus to the administration list, and when the client state apparatus leaves the WFD network, the G/O state apparatus deletes the identification information of that apparatus from the administration list.

The G/O state apparatus is capable of wirelessly communicating object data that is a communication object (e.g., data that includes network layer information of the OSI reference model (print data, etc.)) with an apparatus registered in the administration list, i.e., with the client state apparatus. However, with an apparatus not registered in the administration list, the G/O state apparatus is capable of wirelessly communicating data for participating in the WFD network (e.g., data that does not include network layer information (physical layer data such as a Probe Request signal, Probe Response signal, etc.)) but is not capable of wirelessly communicating the object data. For example, the printer 10 that is in the G/O state is capable of wirelessly receiving print data from the portable terminal 8 that is registered in the administration list (i.e., the portable terminal 8 that is in the client state), but is not capable of wirelessly receiving print data from the apparatus that is not registered in the administration list.

Further, the G/O state apparatus is capable of relaying the wireless communication of object data (print data, etc.) between a plurality of client state apparatuses. For example, in a case where the portable terminal 8 that is in the client state should wirelessly send the print data to another printer that is in the client state, the portable terminal 8 first wirelessly sends the print data to the printer 10 that is in the G/O state. In this case, the printer 10 wirelessly receives the print data from the portable terminal 8, and wirelessly sends the print data to the other printer. That is, the G/O state apparatus is capable of executing the function of an AP (access point) of a wireless network.

Moreover, a WFD-compatible apparatus that is not participating in the WFD network (i.e., an apparatus not registered in the administration list) is a device state apparatus. The device state apparatus is capable of wirelessly communicating data for participating in the WFD network (physical layer data such as a Probe Request signal, Probe Response signal, etc.), but is not capable of wirelessly communicating the object data (print data, etc.) via the WFD network.

Figure 2:
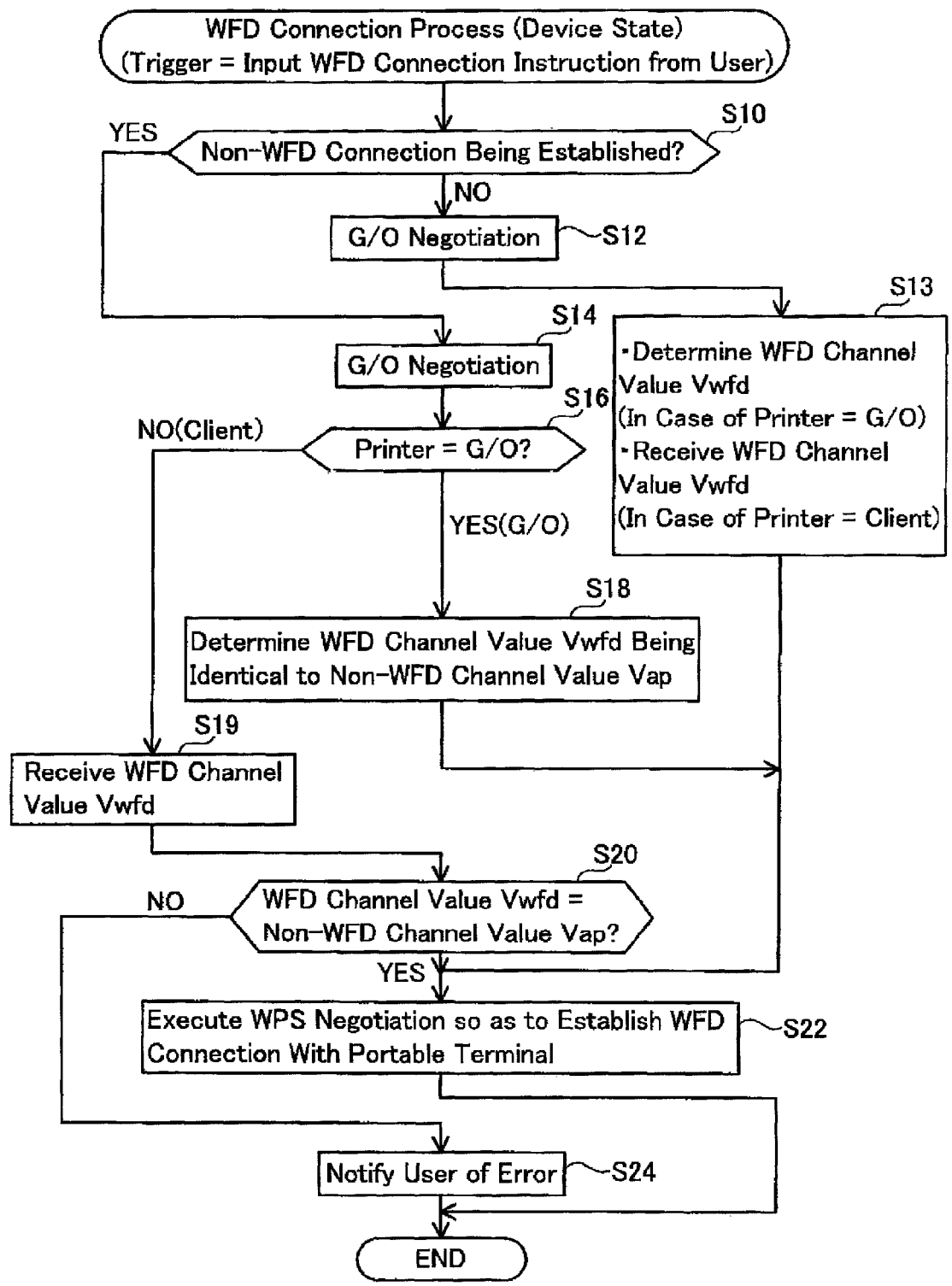
FIG. 2 shows a flowchart of a WFD connection process.

(WFD Connection Process; FIG. 2)

Next, the contents of a process executed by the printer 10 will be described. First, the contents of a WFD connection process executed by the printer 10 will be described with reference to FIG. 2. In a case where the user inputs a predetermined WFD connection instruction to the operating unit 12, the controller 20 starts the WFD connection process of FIG. 2.

In S10, the first connecting unit 30 judges whether the non-WFD connection has been established between the printer 10 and the AP 4. In a case where the non-WFD connection has been established (the case of YES in S10), the process proceeds to S14, and in a case the non-WFD connection has not been established (the case of NO in S10), the process proceeds to S12.

Moreover, although not shown in the flowchart of FIG. 2, in either cases of YES and NO in S10, the first connecting unit 30 executes a Search process for searching for device state apparatuses (e.g., the portable terminal 8) present in the surroundings of the printer 10. Further, the first connecting unit 30 displays, on the display unit 14, an apparatus list that includes information relating to the apparatuses found in the Search process (e.g., device name, model name, MAC address etc.). The user of the printer 10 specifies, from the apparatus list, the apparatus which is to establish the connection with the printer 10. The first connecting unit 30 selects the apparatus in accordance with the instruction of the user. Below, the description will continue using a case, as an example, where the portable terminal 8 was selected.

Further, in a case where the WFD connection instruction is input to the portable terminal 8, the portable terminal 8 that is in the device state executes a Search process, as in the case of the printer 10. Thereby, an apparatus list that includes information relating to the printer 10 is displayed on a display unit of the portable terminal 8. The user of the portable terminal 8 selects, from the apparatus list, the apparatus which is to establish a connection with the portable terminal 8. Below, the description will continue using a case, as an example, where the printer 10 was selected.

In S12, the first connecting unit 30 executes G/O negotiation, determining one apparatus from among the printer 10 and the portable terminal 8 as the G/O, and determining the other apparatus from among the printer 10 and the portable terminal 8 as the client. Specifically, the first connecting unit 30 first sends, to the portable terminal 8, an Intent value of the printer 10 that is being stored in the memory 24. Further, the first connecting unit 30 receives, from the portable terminal 8, the Intent value of the portable terminal 8 that is being stored in the portable terminal 8. The Intent value is a setting value indicating the degree to which an apparatus should become the G/O. The Intent value is any value within a numerical value range of 0 to 15. The greater the Intent value, the higher the possibility of becoming the G/O. In other words, the smaller the Intent value, the higher the possibility of becoming the client.

For example, an apparatus in which the capacity of the CPU and the memory is comparatively high (e.g. a PC) can execute another process rapidly while operating as the G/O. Consequently, a comparatively large Intent value is usually set in this type of apparatus so that it has a high possibility of becoming the G/O. On the other hand, e.g., an apparatus in which the capacity of the CPU and the memory is comparatively low might be unable to execute another process while operating as the G/O. Consequently, a comparatively low Intent value is usually set in this type of apparatus so that it has a low possibility of becoming the G/O (i.e., so that it has a high possibility of becoming the client).

Figure 3:
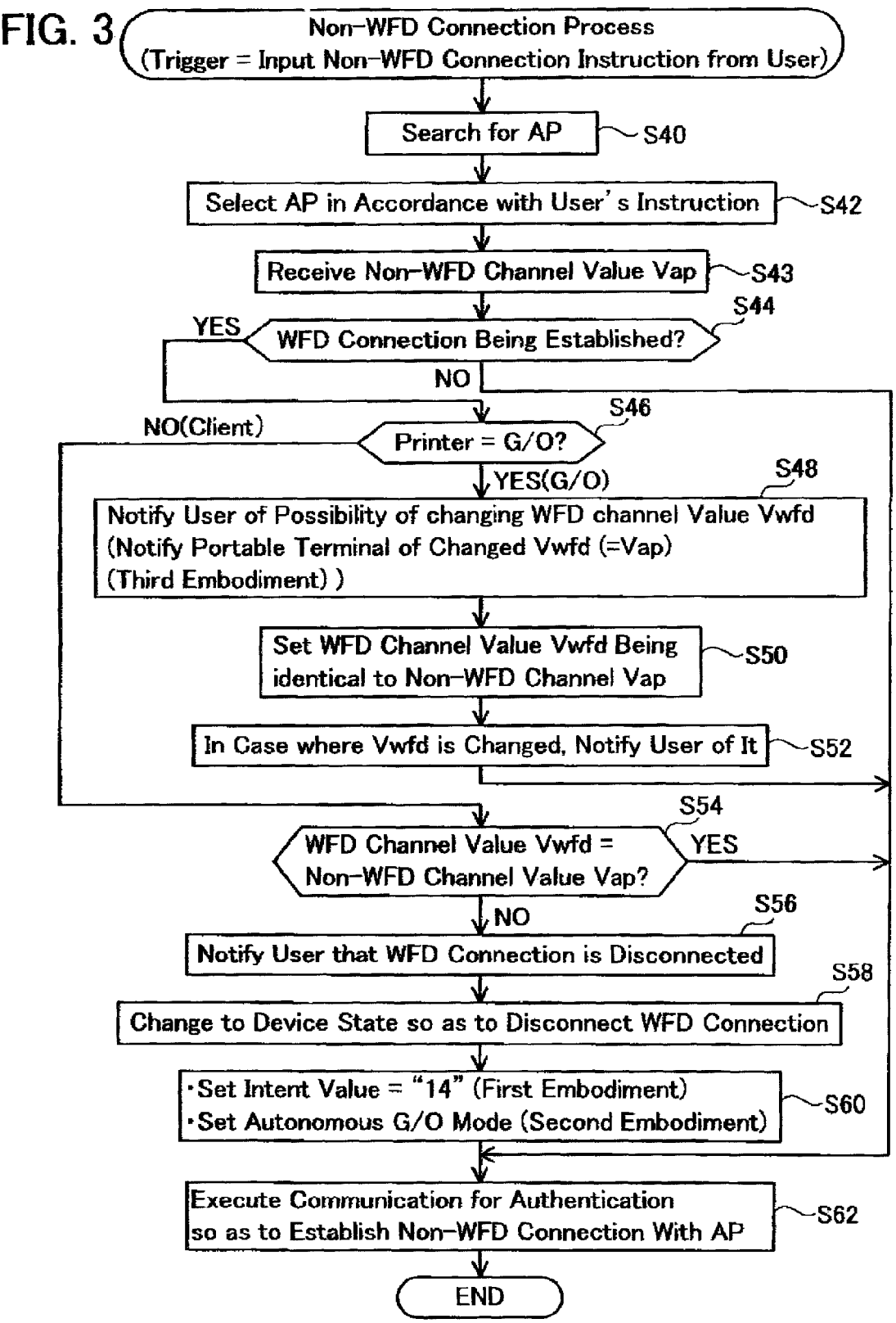
FIG. 3 shows a flowchart of a non-WFD connection process.

In the present embodiment, as long as S60 of FIG. 3 (to be described) is not executed, the Intent value of the printer 10 (i.e., a default Intent value) is "2". The printer 10 usually has a comparatively low CPU and memory capacity compared to a PC, etc. Consequently, a comparatively small default Intent value is set in the printer 10. Consequently, in S12 the first connecting unit 30 sends the Intent value "2" of the printer 10 to the portable terminal 8. However, in S60 of FIG. 3 (to be described), the Intent value of the printer 10 is changed to "14". In S12, which is executed immediately after the Intent value of the printer 10 was changed to "14", the first connecting unit 30 sends the Intent value "14" of the printer 10 to the portable terminal 8.

In S12, the first connecting unit 30 further compares the Intent value of the printer 10 and the Intent value of the portable terminal 8, and determines the G/O and the client. For example, in a case where the Intent value of the printer 10 is greater than the Intent value of the portable terminal 8, the first connecting unit 30 determines that the printer 10 should become the G/O, and determines that the portable terminal 8 should become the client. Further, e.g., in a case where the Intent value of the printer 10 is smaller than the Intent value of the portable terminal 8, the first connecting unit 30 determines that the printer 10 should become the client, and determines that the portable terminal 8 should become the G/O. Moreover, in a case where the Intent value of the printer 10 and the Intent value of the portable terminal 8 are identical, the first connecting unit 30 may change the Intent value of the printer 10 and then re-execute the G/O negotiation using the changed Intent value, may display, on the display unit 14, information indicating that a WFD connection cannot be established, or may, randomly, determine that the printer 10 should become one of the G/O and the client, and determine that the portable terminal 8 should become the other of the G/O and the client.

Further, the portable terminal 8 determines the G/O and the client based on the Intent value of the printer 10 and the Intent value of the portable terminal 8 using the same method as the printer 10. In a case the G/O negotiation in S12 has been completed, the process proceeds to S13.

In S13, the first connecting unit 30 executes a process in accordance with the results of the G/O negotiation of S12. For example, in a case where it is determined that the printer 10 is to become the G/O, in S13 the first connecting unit 30 determines the value of the wireless channel to be used in the WFD connection (called "WFD channel value Vwfd" below). The WFD channel value Vwfd is determined as any value from 1 to 14 ch. In S13, a non-WFD connection is not established. In this case, the first connecting unit 30 determines a predetermined value (e.g., 11 ch) as the WFD channel value Vwfd. Moreover, in a variant, the first connecting unit 30 may randomly select one value from among 1 to 14 ch, and determine that value as the WFD channel value Vwfd. Next, the first connecting unit 30 sends (i.e., notifies) the determined WFD channel value Vwfd to the portable terminal 8. Thereby, the portable terminal 8 can learn the WFD channel value Vwfd, and can use the WFD channel value Vwfd in subsequent communication. Moreover, the first connecting unit 30 stores the determined WFD channel value Vwfd in the memory 24 of the printer 10.

On the other hand, in a case where it is determined that the printer 10 is to become the client, in S13 the first connecting unit 30 does not determine the WFD channel value Vwfd. In this case, the first connecting unit 30 receives, from the portable terminal 8 that is in the G/O state, the WFD channel value Vwfd determined by the portable terminal 8. In this case, the first connecting unit 30 stores the received WFD channel value Vwfd in the memory 24 of the printer 10. When S13 ends, the process proceeds to S22.

In S22, further, the first connecting unit 30 executes a WPS (Wi-Fi Protected Setup) negotiation, establishing a WFD connection with the portable terminal 8. Moreover, in S12, in the case where it was determined that the printer 10 is to become the G/O, the first connecting unit 30 executes WPS negotiation for the G/O state. On the other hand, in S12, in the case where it was determined that the printer 10 is to become the client, the first connecting unit 30 executes a WPS negotiation for the client state.

(WPS Negotiation for G/O State)

In the WPS negotiation for the G/O state, the first connecting unit 30 creates data representing a wireless profile (SSID, authentication mode, encryption mode, password etc.) which is needed to establish a WFD connection. Moreover, the authentication mode and encryption mode are predetermined. Further, the first connecting unit 30 creates the password at the time of the process S22. Moreover, the SSID may be created by the first connecting unit 30 at the time of the process S22, or may be predetermined. Next, using the WFD channel value Vwfd determined in S13, the first connecting unit 30 sends the data representing the wireless profile to the portable terminal 8.

Sending the wireless profile to the portable terminal 8 from the printer 10 allows the printer 10 and the portable terminal 8 to use the same wireless profile. Using the wireless profile, the first connecting unit 30 executes the wireless communication (called "specific wireless communication" below) of an Authentication Request, Authentication Response, Association Request, Association Response, and 4way handshake with the portable terminal 8. Moreover, the WFD channel value Vwfd is used in the specific wireless communication as well. Various authentication processes such as authentication of SSID, authentication of authentication mode and encryption mode, authentication of password, etc. are executed during the course of the specific wireless communication. In a case where all the authentications succeed, a WFD connection is established between the printer 10 and the portable terminal 8.

Next, the first connecting unit 30 adds identification information of the portable terminal 8 (i.e., the MAC address of the portable terminal 8) to the administration list. Thereby, by using the WFD channel value Vwfd, it becomes possible for the printer 10 that is in the G/O state (i.e., the first connecting unit 30) to communicate the object data (print data, etc.) that is the communication object with the portable terminal 8 that is in the client state. Moreover, the object data includes network layer data, which is a layer higher than the physical layer of the OSI reference model. Consequently, the printer 10 that is in the G/O state (i.e., the first connecting unit 30) can execute wireless communication of the network layer with the portable terminal 8 that is in the client state. Further, it becomes possible for the printer 10 that is in the G/O state (i.e., the first connecting unit 30) to relay wireless communication between the portable terminal 8 that is in the client state and another apparatus which is in the client state and is registered in the administration list.

As described above, in the case where it is determined in the G/O negotiation that the printer 10 is to become the G/O, the first connecting unit 30 establishes the WFD connection with the portable terminal 8 by using the WFD channel value Vwfd so that the printer 10 operates in the G/O state.

(WPS Negotiation for Client State)

On the other hand, in the WPS negotiation for the client state, the first connecting unit 30 receives data representing a wireless profile from the portable terminal 8 by using the WFD channel value Vwfd received in S13. Next, using the wireless profile, the first connecting unit 30 executes the specific wireless communication with the portable terminal 8. Thereby, the WFD connection between the printer 10 and the portable terminal 8 is established.

Moreover, the portable terminal 8 adds identification information of the printer 10 (i.e., the MAC address of the printer 10) to the administration list. Thereby, by using the WFD channel value Vwfd, it becomes possible for the printer 10 that is in the client state (i.e., the first connecting unit 30) to communicate the object data (print data, etc.) that is the communication object with the portable terminal 8 that is in the G/O state.

As described above, in the case where it is determined in the G/O negotiation that the printer 10 is to become the client, the first connecting unit 30 establishes the WFD connection with the portable terminal 8 by using the WFD channel value Vwfd so that the printer 10 operates in the client state. When S22 ends, the WFD connection process of FIG. 2 ends.

Next, the contents of processes from S14 onwards, which are executed in the case of YES in S10 (in the case where a non-WFD connection is currently established), will be described. In S14, the first connecting unit 30 executes G/O negotiation in the same manner as in S12. Next, in S16 the first connecting unit 30 judges whether it was determined that the printer 10 is to become the G/O. In a case where it was determined that the printer 10 is to become the G/O (the case of YES in S16), the process proceeds to S18, and in a case where it was determined that the printer 10 is to become the client (the case of NO in S16), the process proceeds to S19.

In S18, the first connecting unit 30 first specifies the value of a wireless channel to be used in the non-WFD connection which is currently established (called "non-WFD channel value Vap" below). As will be described in detail later, the non-WFD channel value Vap is determined by the AP 4 as any value from 1 to 14 ch. Thereupon, the non-WFD channel value Vap is stored in the memory 24 of the printer 10 at the time of executing the process S43 of FIG. 3. The first connecting unit 30 specifies the non-WFD channel value Vap by reading the non-WFD channel value yap from the memory 24. Next, the first connecting unit 30 determines the WFD channel value Vwfd as a value that is identical to the non-WFD channel value Vap. Moreover, the first connecting unit 30 stores the determined WFD channel value Vwfd in the memory 24 of the printer 10.

As described above, in S18 the first connecting unit 30 causes the WFD channel value Vwfd and the non-WFD channel value Vap to be identical. The reason is as follows. The wireless interface 18 is, physically, one interface. Consequently the printer 10 cannot execute the wireless communication appropriately via the wireless interface 18 by using a plurality of wireless channels simultaneously. Consequently, in a case where the WFD channel value Vwfd and the non-WFD channel value Vap differed, the printer 10 could not, simultaneously, appropriately execute a wireless communication using the WFD connection and a wireless communication using the non-WFD connection. Consequently, in S18 the first connecting unit 30 causes the WFD channel value Vwfd and the non-WFD channel value Vap to be identical, thereby simultaneously realizing the appropriate execution of communication using the WFD connection and communication using the non-WFD connection.

In S22, which is executed after S18, the first connecting unit 30 executes WPS negotiation for the G/O state. Thereby, using the WFD channel value Vwfd determined in S18, the first connecting unit 30 establishes a WFD connection with the portable terminal 8. Since a non-WFD connection with the AP 4 has already been established, a state is formed in which both a non-WFD connection with the AP 4 and a WFD connection with the portable terminal 8 have been established. Thereby, the WFD connection process of FIG. 2 ends.

On the other hand, in S19 the first connecting unit 30 receives, from the portable terminal 8 that is in the G/O state, the WFD channel value Vwfd determined by the portable terminal 8. The first connecting unit 30 stores the received WFD channel value Vwfd in the memory 24 of the printer 10.

Next, in S20 the channel judgment unit 34 specifies the WFD channel value Vwfd and the non-WFD channel value Vap by reading the WFD channel value Vwfd and the non-WFD channel value Vap from the memory 24. Thereupon, the channel judgment unit 34 judges whether the WFD channel value Vwfd and the non-WFD channel value Vap are identical.

In a case where it is judged that the WFD channel value Vwfd and the non-WFD channel value Vap are identical (the case of YES in S20), in S22 the first connecting unit 30 executes WPS negotiation for the client state. Thereby, by using the WFD channel value Vwfd received in S19, the first connecting unit 30 establishes a WFD connection with the portable terminal 8. Since a non-WFD connection with the AP 4 has already been established, a state is formed in which both the non-WFD connection with the AP 4 and the WFD connection with the portable terminal 8 are established. Thereby, the WFD connection process of FIG. 2 ends.

On the other hand, in a case where it is judged that the WFD channel value Vwfd and the non-WFD channel value Vap are not identical (the case of NO in S20), in S24 the first connecting unit 30 displays, on the display unit 14, information indicating that the WFD connection cannot be established. In this case, the first connecting unit 30 does not establish a WFD connection with the portable terminal 8. However, the non-WFD connection with the AP 4, which is currently established, is maintained. That is, the second connecting unit 32 maintains the non-WFD connection with the AP 4. Thereby, a state is formed where only the non-WFD connection with the AP 4 is established.

For example, a configuration can be conceived in which, in the case where it is judged that the WFD channel value Vwfd and the non-WFD channel value Vap are not identical (the case of NO in S20), the non-WFD connection with the AP 4 is disconnected, and a WFD connection with the portable terminal 8 is established. However, as described above, the non-WFD network is a network that is to remain constructed constantly, and if this type of network is disconnected, the user of the PC 6 can no longer execute printing on the printer 10. In order to prevent such an event from occurring, a configuration is adopted in the present embodiment where, in the case of NO in S20, the non-WFD connection with the AP 4 which is currently established is maintained, and a WFD connection with the portable terminal 8 is not established. That is, in the present embodiment, a configuration is adopted which gives priority not to the WFD network which is to be constructed temporarily, but to the non-WFD network which is to remain constructed constantly. When S24 ends, the WFD connection process of FIG. 2 ends.

(Non-WFD Connection Process; FIG. 3)

Next, the contents of the non-WFD connection process executed by the printer 10 will be described with reference to FIG. 3. When the user inputs a predetermined non-WFD connection instruction to the operating unit 12, the controller 20 starts the non-WFD connection process of FIG. 3.

In S40, the second connecting unit 32 executes a Scan process for searching for APs present in the surroundings of the printer 10. Next, in S42, the second connecting unit 32 displays, on the display unit 14, an AP list including information (e.g., SSID, etc.) relating to the APs found in the Scan process. The user of the printer 10 specifies, from within the AP list, the AP with which the printer 10 is to establish a connection. The second connecting unit 32 selects the AP in accordance with the instruction of the user. Below, the description will continue using, as an example, a case where the AP 4 was selected.

Unlike the first connecting unit 30 (see FIG. 2), the second connecting unit 32 does not execute G/O negotiation. The AP 4 determines, from among 1 to 14 ch, the value of a wireless channel to be used in the non-WFD connection (i.e., the non-WFD channel value Vap). The AP 4 sends the non-WFD channel value Vap to the printer 10. Consequently, in S43 the second connecting unit 32 receives the non-WFD channel value Vap. The second connecting unit 32 stores the non-WFD channel value Vap in the memory 24.

Next, in S44 the second connecting unit 32 judges whether the WFD connection between the printer 10 and the portable terminal 8 has been established. In a case where the WFD connection has been established (the case of YES in S44), the process proceeds to S46, and in a case the WFD connection has not been established (the case of NO in S44), the process proceeds to S62.

In S62, using the non-WFD channel value Vap received in S43, the second connecting unit 32 executes communication for authentication with the AP 4. In the communication executed at this occasion, the second connecting unit 32 sends data of an authentication mode, encryption mode, password, etc. to the AP 4. Thereby, the AP 4 executes the authentication of the authentication mode, encryption mode, password, etc. and, if the authentication succeeds, sends data to the printer 10 indicating that the authentication succeeded. Thereby, the non-WFD connection is established between the printer 10 and the AP 4. Consequently, using the non-WFD channel value Vap, the printer 10 (i.e., the second connecting unit 32) can execute the communication of the object data (print data, etc.) that is the communication object with the PC 6 via the AP 4. When S62 ends, the non-WFD connection process of FIG. 3 ends.

On the other hand, in S46 the second connecting unit 32 judges whether the printer 10 is in the G/O state in the WFD connection which is currently established. In a case where the printer 10 is in the G/O state (the case of YES in S46), in S48 the second connecting unit 32 displays, on the display unit 14, information indicating that it is possible to change the WFD channel value Vwfd.

Next, in S50 the first connecting unit 30 sets the WFD channel value Vwfd within the memory 24 to a value identical to the non-WFD channel value Vap received in S43. For example, in a case where the WFD channel value Vwfd within the memory 24 and the non-WFD channel value Vap received in S43 are identical, the WFD channel value Vwfd within the memory 24 is not changed in S50. In this case, the WFD connection between the printer 10 and the portable terminal 8 is maintained.

By contrast, e.g., in a case where the WFD channel value Vwfd within the memory 24 and the non-WFD channel value Vap received in S43 are not identical, in S50 the WFD channel value Vwfd within the memory 24 is changed. In this case, the printer 10 (i.e., the first connecting unit 30) cannot communicate with the portable terminal 8 using the changed WFD channel value Vwfd. This is because the portable terminal 8 is continuing to use the unchanged WFD channel value Vwfd. Consequently, the first connecting unit 30 handles the portable terminal 8 as an administration object that has left the WFD network, and removes the identification information of the portable terminal 8 from the administration list. Thereby, the first connecting unit 30 disconnects the WFD connection with the portable terminal 8. Moreover, after the WFD connection with the portable terminal 8 has been disconnected, the first connecting unit 30 changes the state of the printer 10 from the G/O state to the device state after a predetermined time has elapsed.

Moreover, in a case where the WFD channel value Vwfd was changed in S50, in S52 the second connecting unit 32 displays, on the display unit 14, information indicating that the WFD connection with the portable terminal 8 has been disconnected. Moreover, in a case where the WFD channel value Vwfd was not changed in S50, the second connecting unit 32 does not execute the process S52. When S52 ends, in S62 the second connecting unit 32 establishes a non-WFD connection with the AP 4 by using the non-WFD channel value Vap received in S43, in the same manner as described above.

As described above, in S50, in the case where the WFD channel value Vwfd within the memory 24 and the non-WFD channel value Vap received in S43 are identical, the WFD connection with the portable terminal 8 is maintained. Consequently, in this case, a state is formed in which both the non-WFD connection with the AP 4 and the WFD connection with the portable terminal 8 are established. On the other hand, in S50, in the case where the WFD channel value Vwfd within the memory 24 and the non-WFD channel value Vap received in S43 are not identical, the WFD connection with the portable terminal 8 is disconnected. Consequently, in this case, a state is formed in which only the non-WFD connection with the AP 4 is established. That is, in the non-WFD connection process of FIG. 3, as in the WFD connection process of FIG. 2, a configuration is adopted which gives priority not to the WFD network which is to be constructed temporarily, but to the non-WFD network which is to remain constructed constantly.

On the other hand, in the case where the printer 10 is in the client state (the case of NO in S46), in S54 the channel judgment unit 34 judges whether the WFD channel value Vwfd within the memory 24 and the non-WFD channel value Vap received in S43 are identical.

In the case where the two channel values Vwfd, Vap are identical (the case of YES in S54), in S62 the second connecting unit 32 establishes a non-WFD connection with the AP 4 by using the non-WFD channel value Vap received in S43, in the same manner as described above. In this case, a state is formed in which both the non-WFD connection with the AP 4 and the WFD connection with the portable terminal 8 are established.

On the other hand, in the case where the two channel values Vwfd, Vap are not identical (the case of NO in S54), in S56 the second connecting unit 32 displays, on the display unit 14, information indicating that the WFD connection with the portable terminal 8 is to be disconnected.

Next, in S58 the first connecting unit 30 changes the state of the printer 10 from the G/O state to the device state. Specifically, the first connecting unit 30 deletes the administration list that is being stored by the printer 10 that is in the G/O state and the WFD channel value Vwfd within the memory 24. Thereby, the WFD connection with the portable terminal 8 is disconnected.

Next, in S60 the first connecting unit 30 changes the Intent value of the printer 10 within the memory 24 from "2" to "14". Moreover, in a variant, in S60 the first connecting unit 30 may change the Intent value to a value different from "14" (e.g., "13", "15", etc.). That is, in S60 the first connecting unit 30 may change the Intent value of the printer 10 within the memory 24 to a value greater than the current value. Thereby, in a case where the WFD connection process of FIG. 2 is re-executed, the first connecting unit 30 can use a comparatively large value as the Intent value of the printer 10 in the G/O negotiation of S12 or S14. That is, the printer 10 has a high possibility of being determined to be the G/O.

Moreover, although not shown in the flowchart, when the G/O negotiation is executed a first time (S12 or S14 of FIG. 2) after the Intent value was changed to "14" in S60, the Intent value of the printer 10 within the memory 24 is returned from "14" to "2".

When S60 ends, in S62 the second connecting unit 32 establishes a non-WFD connection with the AP 4 by using the non-WFD channel value Vap received in S43, in the same manner as described above. Since the WFD connection with the portable terminal 8 was disconnected in S58, a state is formed in which only the non-WFD connection with the AP 4 is established. That is, here also a configuration is adopted which gives priority to the non-WFD network which is to remain constructed constantly.

Specific Examples

Figure 5:
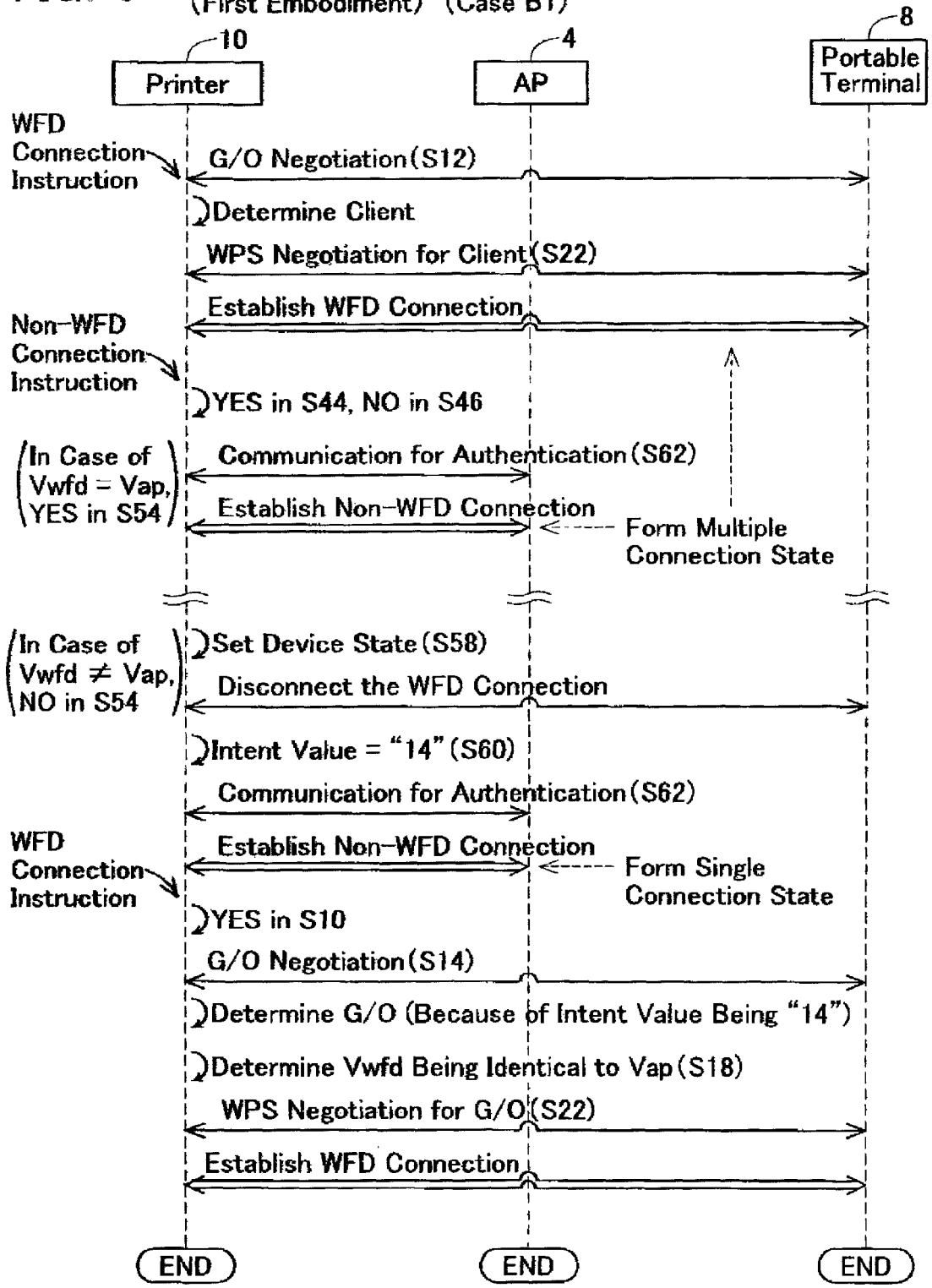
FIG. 5 shows a sequence view of a case B1.
Figure 6:
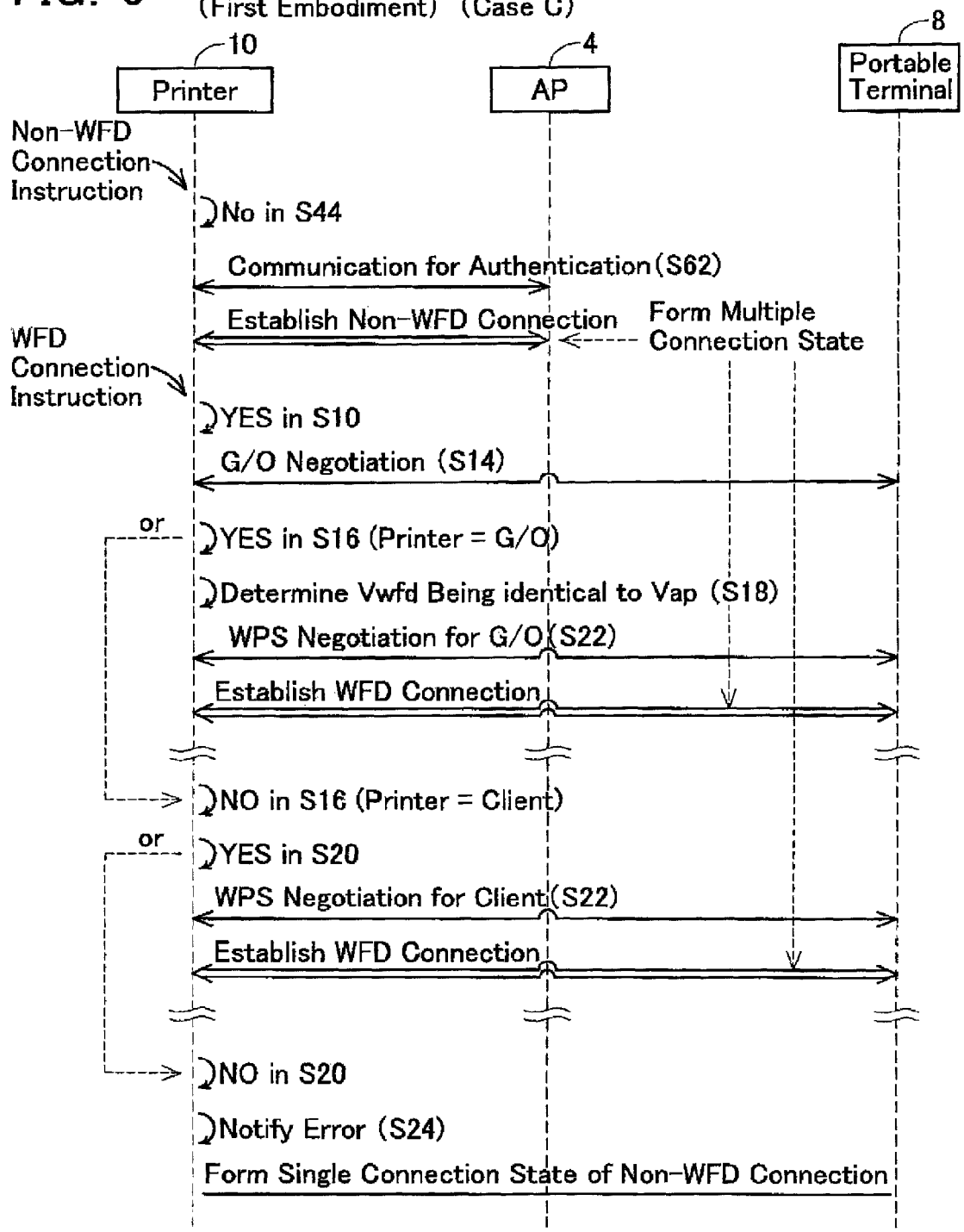
FIG. 6 shows a sequence view of a case C.

Next, various cases of processes executed by the apparatuses 4, 8, 10 will be described with reference to FIG. 4 to 6. Moreover, the sequences of FIG. 4 to 6 are realized by the printer 10 executing processes in accordance with the flowcharts of FIG. 2 and FIG. 3.

(Case A1; FIG. 4)

Figure 4:
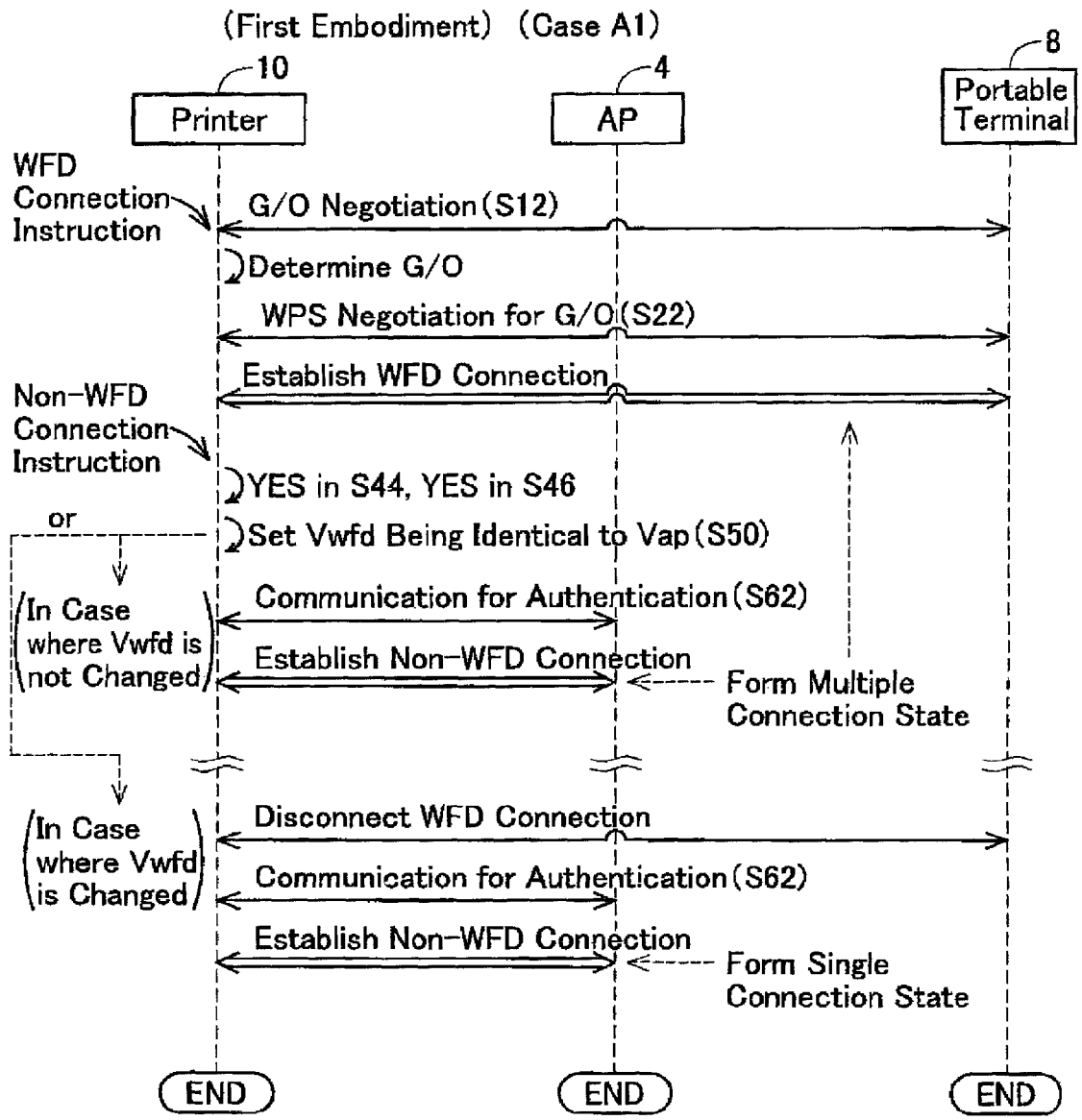
FIG. 4 shows a sequence view of a case A1.

Case A1 of FIG. 4 shows a case where a WFD connection between the printer 10 and the portable terminal 8 is established, and then a non-WFD connection between the printer 10 and the AP 4 is established. Case A1 further shows a case where, in the WFD connection, it is determined that the printer 10 is to become the G/O.

When a WFD connection instruction is input to the printer 10, the printer 10 executes G/O negotiation (S12 of FIG. 2). Here, "2" is used as the Intent value of the printer 10. For example, in a case where the Intent value of the portable terminal 8 is "1", the printer 10 determines in the G/O negotiation that the printer 10 is to become the G/O. Next, the printer 10 determines the WFD channel value Vwfd (specifically, "11 ch") (S13) and, using the determined WFD channel value Vwfd, executes WPS negotiation for the G/O state (S22). Thereby, the WFD connection between the printer 10 and the portable terminal 8 is established.

Next, when a non-WFD connection instruction is input to the printer 10, the printer 10 receives the non-WFD channel value Vap from the AP 4 (S43 of FIG. 3), judges YES in S44, and judges YES in S46. In this case, the printer 10 sets the WFD channel value Vwfd currently being used in the WFD connection to a value that is identical to the non-WFD channel value Vap (S50).

In the case where the WFD channel value Vwfd is not changed, the WFD connection is maintained. Using the non-WFD channel value Vap, the printer 10 executes communication for authentication (S62). Thereby, a non-WFD connection between the printer 10 and the AP 4 is established. Consequently, a state is formed in which both the WFD connection and the non-WFD connection have been established (called "multiple connection state" below).

On the other hand, in the case where the WFD channel value Vwfd is changed, the WFD connection is disconnected. That is, by changing the WFD channel value Vwfd, the printer 10 disconnects the WFD connection. Next, using the non-WFD channel value Vap, the printer 10 executes communication for authentication (S62 of FIG. 3). Thereby, a non-WFD connection between the printer 10 and the AP 4 is established. Consequently, a state is formed in which only the non-WFD connection has been established (called "single connection state" below).

(Case B1; FIG. 5)

Case B1 of FIG. 5 shows a case where a WFD connection between the printer 10 and the portable terminal 8 is established, and then a non-WFD connection between the printer 10 and the AP 4 is established. Case B1 further shows a case where, in the WFD connection, it is determined that the printer 10 is to become the client.

When a WFD connection instruction is input to the printer 10, the printer 10 executes G/O negotiation (S12 of FIG. 2). Here, "2" is used as the Intent value of the printer 10. For example, in the case where the Intent value of the portable terminal 8 is "3" or more, the printer 10 determines in the G/O negotiation that the printer 10 is to become the client. Next, the printer 10 receives the WFD channel value Vwfd from the portable terminal 8 (S13) and, using the received WFD channel value Vwfd, executes WPS negotiation for the client state (S22). Thereby, a WFD connection between the printer 10 and the portable terminal 8 is established.

Next, when a non-WFD connection instruction is input to the printer 10, the printer 10 receives the non-WFD channel value Vap from the AP 4 (S43 of FIG. 3), judges YES in S44, and judges NO in S46.

In the case where the WFD channel value Vwfd currently being used in the WFD connection and the non-WFD channel value Vap are identical (YES in S54), the WFD connection is maintained. Using the non-WFD channel value Vap, the printer 10 executes communication for authentication (S62). Thereby, a non-WFD connection between the printer 10 and the AP 4 is established. Consequently, a multiple connection state is formed.

On the other hand, in the case where the WFD channel value Vwfd currently being used in the WFD connection and the non-WFD channel value Vap are not identical (NO in S54), the printer 10 disconnects the WFD connection by changing the state of the printer 10 from the client state to the device state (S58). Next, the printer 10 changes the Intent value of the printer 10 from "2" to "14" (S60). Next, using the non-WFD channel value Vap, the printer 10 executes communication for authentication (S62). Thereby, a non-WFD connection between the printer 10 and the AP 4 is established. Consequently, a single connection state is formed.

Next, when the WFD connection instruction is re-input to the printer 10, the printer 10 judges YES in S10 of FIG. 2, and executes G/O negotiation (S14). Here, because the comparatively large value "14" is used as the Intent value of the printer 10, it is usually determined that the printer 10 is to become the G/O. Next, the printer 10 determines the WFD channel value Vwfd as a value that is identical to the non-WFD channel value Vap currently being used in the non-WFD connection (S18). Next, using the determined WFD channel value Vwfd, the printer 10 executes WPS negotiation for the G/O state (S22). Thereby, a WFD connection between the printer 10 and the portable terminal 8 is established. Consequently, a multiple connection state is formed.

(Case C; FIG. 6)

The case C of FIG. 6 shows a case in which a non-WFD connection is established between the printer 10 and the AP 4, and then a WFD connection is established between the printer 10 and the portable terminal 8.

When the non-WFD connection instruction is input to the printer 10, the printer 10 receives the non-WFD channel value Vap from the AP 4 (S43 of FIG. 3) and judges NO in S44. Next, using the received non-WFD channel value Vap, printer 10 executes the communication for authentication (S62). Thereby, the non-WFD connection between the printer 10 and the AP 4 is established.

Next, when the WFD connection instruction is input to the printer 10, the printer 10 judges YES in S10 of FIG. 2, and executes G/O negotiation (S14). In the case where it is determined that the printer 10 is to become the G/O, the printer 10 judges YES in S16 of FIG. 2, and determines the WFD channel value Vwfd as a value that is identical to the non-WFD channel value Vap currently being used in the non-WFD connection (S18). Next, using the determined WFD channel value Vwfd, the printer 10 executes WPS negotiation for the G/O state (S22). Thereby, a WFD connection between the printer 10 and the portable terminal 8 is established. Consequently, a multiple connection state is formed.

On the other hand, in the case where it is determined that the printer 10 is to become the client, the printer 10 judges NO in S16 of FIG. 2, and receives the WFD channel value Vwfd from the portable terminal 8 (S19).

In the case where the received WFD channel value Vwfd and the non-WFD channel value Vap currently being used in the non-WFD connection are identical (YES in S20), the printer 10 executes WPS negotiation for the client state by using the received WFD channel value Vwfd (S22). Thereby, a WFD connection between the printer 10 and the portable terminal 8 is established. Consequently, a multiple connection state is formed.

On the other hand, in the case where the received WFD channel value Vwfd and the non-WFD channel value Vap currently being used in the non-WFD connection are not identical (NO in S20), the printer 10 displays, on the display unit 14, information indicating that the WFD connection cannot be established (S24). In this case, the printer 10 does not establish the WFD connection. Consequently, a single connection state is formed.

Effects of First Embodiment

As shown in cases A1, B1 of FIG. 4 and FIG. 5, in the situation in which a non-WFD connection is to be established when a WFD connection has been established, the printer 10 forms a multiple connection state in the case where the WFD channel value Vwfd and the non-WFD channel value yap are identical. Thereby, using the WFD connection, the printer 10 can receive printing data from the portable terminal 8 and, using the non-WFD connection, can receive printing data from the PC 6 via the AP 4. Moreover, with the configuration of the wireless interface 18, the printer 10 cannot execute appropriate wireless communication using two different channel values. Consequently, in the situation in which a non-WFD connection is to be established when a WFD connection has been established, in the case where the WFD channel value Vwfd and the non-WFD channel value Vap are not identical, the printer 10 disconnects the WFD connection and forms a single connection state in which only the non-WFD connection is established. Thereby, using the non-WFD connection, the printer 10 can appropriately receive printing data from the PC 6 via the AP 4. In particular, the printer 10 gives priority to the non-WFD connection that is to remain established constantly, forming the single connection state. Consequently, in the environment in which the printer 10 and the PC 6 are installed (e.g. within the specific company), the user of the PC 6 can prevent the occurrence of being unable to print using the printer 10. According to the present embodiment, the printer 10 can form an appropriate connection state.

Moreover, as shown in case B1 of FIG. 5, in the case where the WFD channel value Vwfd and the non-WFD channel value Vap are not identical, the printer 10 changes the Intent value from "2" to "14". Consequently, in the case where the WFD connection instruction is re-input to the printer 10, the printer 10 usually determines that the printer 10 is to become the G/O, and determines the WFD channel value Vwfd as a value that is identical to the non-WFD channel value Vap. Thereby, the printer 10 can appropriately establish a WFD connection, and consequently can form a multiple connection state appropriately.

Further, as shown in case C of FIG. 6, also in a situation in which a WFD connection is to be established in a state where a non-WFD connection has been established, the printer 10 forms a multiple connection state in the case where the WFD channel value Vwfd and the non-WFD channel value Vap are identical and, in the case where the WFD channel value Vwfd and the non-WFD channel value Vap are not identical, disconnects the WFD connection and forms a single connection state in which only the non-WFD connection is established. Consequently, the printer 10 can form an appropriate connection state.

(Corresponding Relationships)

The printer 10, the portable terminal 8, and the AP 4 are respectively examples of the "wireless communication device", the "first device", and the "second device". The G/O state, the client state, and the device state are respectively examples of the "parent station state", the "child station state", and the "particular state". The G/O negotiation is an example of the "state determination process". The Intent value "2" and the Intent value "14" are respectively examples of the "first setting value" and the "second setting value". The WFD connection and the non-WFD connection are respectively examples of the "first type of connection" and the "second type of connection". The WFD channel value Vwfd and the non-WFD channel value Vap are respectively examples of the "value of the first wireless channel" and the "value of the second wireless channel". Cases A1 and B1 of FIG. 4 and FIG. 5 are an example of "the particular situation in which the second type of connection with the second device is to be established while the first type of connection with the first device has been established". Case C of FIG. 6 is an example of "the particular situation in which the first type of connection with the first device is to be established when the second type of connection with the second device has been established".

Second Embodiment

Points differing from the first embodiment will be described. In the present embodiment, the contents of process S60 of FIG. 3 differ from the first embodiment. In S60, the first connecting unit 30 sets the printer 10 to autonomous G/O mode. The autonomous G/O mode is a mode which keeps the printer 10 operating in the G/O state. Consequently, the WFD connection has not been established at the stage of S60, but the printer 10 is set in the G/O state. At this stage, identification information of the client state apparatus is not described in the administration list which is managed by the printer 10.

Figure 7:
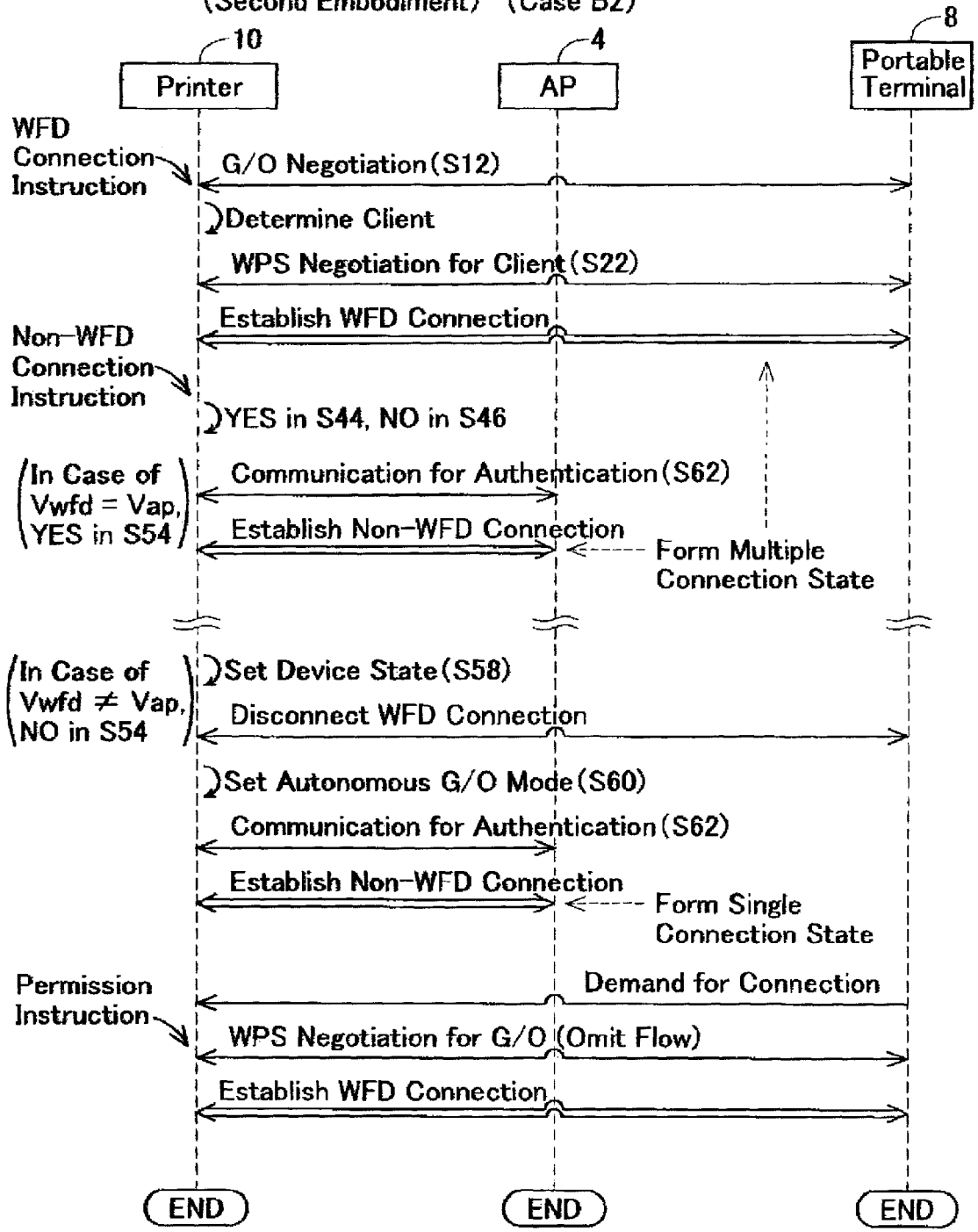
FIG. 7 shows a sequence view of a case B2 of a second embodiment.

(Case B2; FIG. 7)

In the present embodiment, instead of case B1 of FIG. 5, case B2 of FIG. 7 is realized. The processes until a single connection state is formed are the same as in case B1 of FIG. 5. However, as described above, in S60 of FIG. 3 the printer 10 sets the printer 10 to the autonomous G/O mode. Moreover, in S60, the printer 10 (i.e., the first connecting unit 30) determines the WFD channel value Vwfd that is a value identical to the non-WFD channel value Vap (omitted in the flowchart).

After the WFD connection has been disconnected, the user of the portable terminal 8 inputs a WFD connection instruction to the portable terminal 8. In this case, the portable terminal 8 searches for G/O state apparatuses (i.e., the printer 10) present in the surroundings of the portable terminal 8. In the course of this search, the portable terminal 8 can learn the WFD channel value Vwfd being used by the printer 10 that is in the G/O state (i.e., a value that is identical to the non-WFD channel value yap). Using the WFD channel value Vwfd, the portable terminal 8 sends a connection demand to the printer 10.

After the printer 10 has received the connection demand from the portable terminal 8, the user of the printer 10 inputs a permission instruction to the printer 10. In this case, without executing G/O negotiation, the printer 10 (i.e., the first connecting unit 30) executes WPS negotiation for the G/O state (omitted in the flowchart) by using the WFD channel value Vwfd. Thereby, the WFD connection between the printer 10 and the portable terminal 8 is established. Consequently, a multiple connection state is formed.

Effects of Second Embodiment

As shown in case B2 of FIG. 7, in case the WFD channel value Vwfd and the non-WFD channel value Vap are not identical, the printer 10 sets the printer 10 to autonomous G/O mode. Consequently, upon receiving the connection demand from the portable terminal 8, the printer 10 can appropriately establish a WFD connection and therefore can form the multiple connection state appropriately. In the present embodiment, the autonomous G/O mode is an example of the "particular mode".

Third Embodiment

Points differing from the first embodiment will be described. In the present embodiment, the contents of process S48 of FIG. 2 differ from the first embodiment. As described above, in S50 the WFD channel value Vwfd may be changed so that the WFD channel value Vwfd is set to a value that is identical to the non-WFD channel value Vap. In S48, the notification unit 36 notifies (i.e., sends) the portable terminal 8 of the changed WFD channel value Vwfd (i.e., the value that is identical to the non-WFD channel value Vap).

Figure 8:
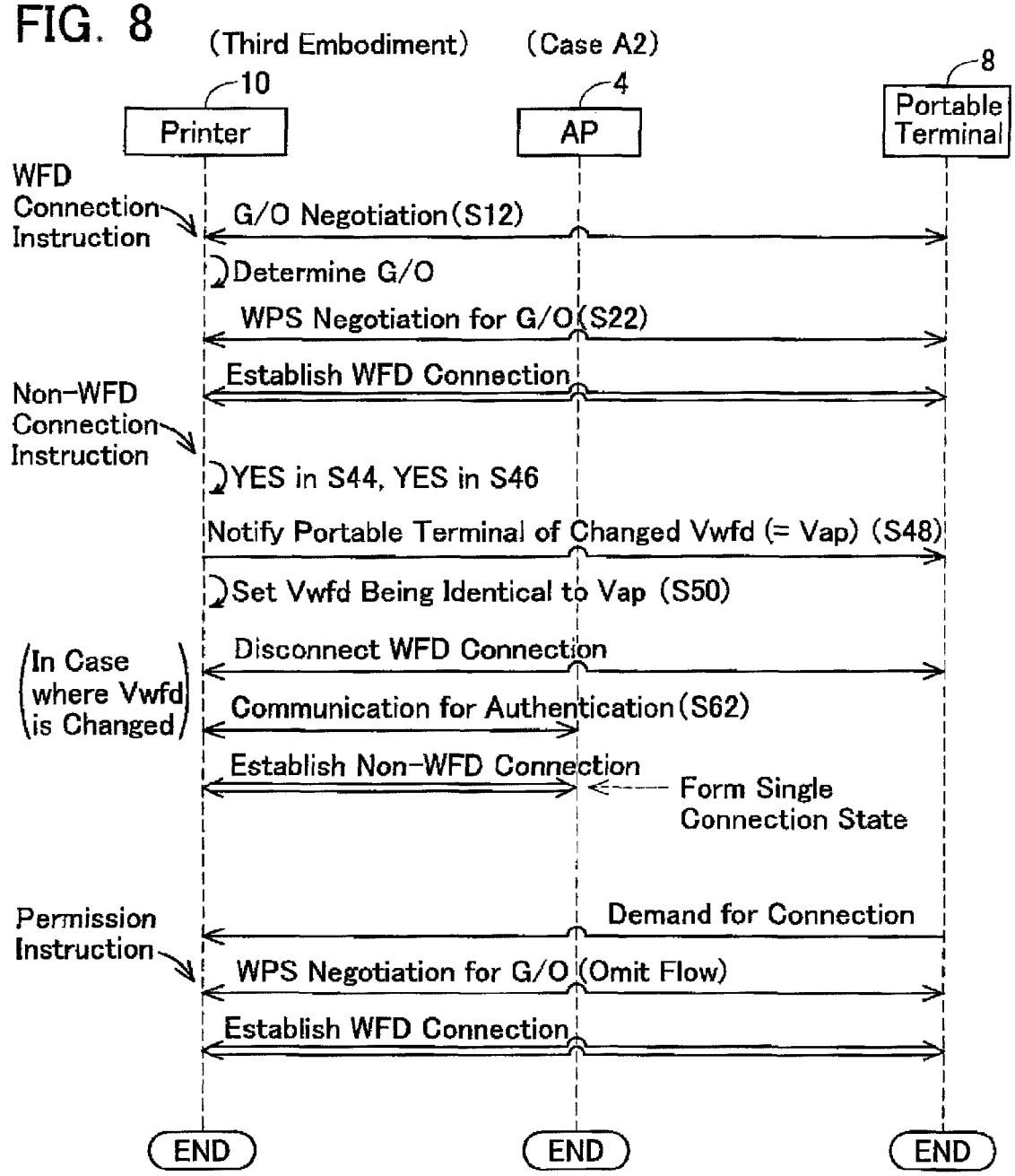
FIG. 8 shows a sequence view of a case A2 of a third embodiment.

(Case A2; FIG. 8)

In the present embodiment, instead of case A1 of FIG. 4, case A2 of FIG. 8 is realized. The processes until a single connection state is formed are the same as in case A1 of FIG. 4. However, as described above, in S48 of FIG. 2 the printer 10 notifies (i.e., sends) the portable terminal 8 of the changed WFD channel value Vwfd. Moreover, even if the WFD channel value Vwfd is changed and the WFD connection is disconnected (S50), the printer 10 maintains the G/O state for a predetermined period (omitted in the flowchart).

Upon acquiring the changed WFD channel value Vwfd from the printer 10, the portable terminal 8 sends a connection demand to the printer 10 by using the changed WFD channel value Vwfd. Moreover, the portable terminal 8 sends the connection demand to the printer 10 even if a WFD connection instruction is not input to the portable terminal 8 (see the second embodiment).

After the printer 10 has received the connection demand from the portable terminal 8, the user of the printer 10 inputs a permission instruction to the printer 10. In this case, without executing G/O negotiation, the printer 10 (i.e., the first connecting unit 30) executes WPS negotiation for the G/O state (omitted in the flowchart) by using the changed WFD channel value Vwfd. Thereby, a WFD connection between the printer 10 and the portable terminal 8 is established. Consequently, a multiple connection state is formed.

Result of Third Embodiment

As shown in case A2 of FIG. 8, in the case where the WFD channel value Vwfd and the non-WFD channel value Vap are not identical, the printer 10 notifies the portable terminal 8 of the changed WFD channel value Vwfd. Consequently, the portable terminal 8 can send a connection demand to the printer 10 by using the changed WFD channel value Vwfd. Consequently, upon receiving the connection demand from the portable terminal 8, the printer 10 can appropriately establish a WFD connection and therefore can form the multiple connection state appropriately.

(Variant 1) The "wireless communication device" is not restricted to the printer 10, but may be another apparatus capable of wireless communication (e.g., a portable terminal, PC, server, FAX device, copier, scanner, multi-function device, etc.). Further, the "first device" and the "second device" are not restricted to the portable terminal 8 and the AP 4, but may be another apparatus capable of wireless communication (e.g., a PC, server, printer, FAX device, copier, scanner, multi-function device, etc.).

(Variant 2) The "parent station state" is not restricted to the WFD G/O state, but may be any state that manages other devices constituting the wireless network (e.g., manages a list of information relating to another device, relays wireless communication of another device, etc.). Further, the "child station state" is not restricted to the WFD client state, but may be any state managed by a parent station state apparatus. Consequently, the "first type of connection" is not restricted to the WFD connection, but may be another type of connection for the wireless communication device to selectively operate in one state from among the parent station state and the child station state.

(Variant 3) The "second type of connection" is not restricted to the non-WFD connection with the AP 4, but may be e.g., a WFD connection with a PC, etc. That is, the "first type of connection" and the "second type of connection" may be the same type of connection. Further, the "second type of connection" may be e.g., an ad hoc connection with a PC, etc.

(Variant 4) In the above embodiments, in the G/O negotiation in S12 of FIG. 2 and in G/O negotiation in S14, the first connecting unit 30 determines that the printer 10 is to become the WO in the case where the Intent value of the printer 10 is greater than the Intent value of the portable terminal 8. Instead, the first connecting unit 30 may determine that the printer 10 is to become the G/O in the case where the Intent value of the printer 10 is smaller than the Intent value of the portable terminal 8. In the above embodiments, the "second setting value" is a value greater than the "first setting value". However, in the present variant, the "second setting value" may be a value smaller than the "first setting value".

(Variant 5) In the first embodiment, in the case where the printer 10 is in the client state and the WFD channel value Vwfd and the non-WFD channel value Vap are not identical, the first connecting unit 30 changes the Intent value from "2" to "14" (S60 of FIG. 3). In the case where the printer 10 is in the G/O state and the WFD channel value Vwfd and the non-WFD channel value Vap are not identical, the first connecting unit 30 does not change the Intent value (S48 to S52 of FIG. 3). Instead, in the case where the printer 10 is in the G/O state and the WFD channel value Vwfd and the non-WFD channel value Vap are not identical, the first connecting unit 30 may change the Intent value from "2" to "14". That is, in the case where a single connection state is to be formed in case A1 of FIG. 4, the first connecting unit 30 may change the Intent value from "2" to "14".

According to this configuration, in the case where a WFD connection instruction is re-input to the printer 10 after the single connection state has been formed in case A1 of FIG. 4, the first connecting unit 30 usually determines in the G/O negotiation of S14 of FIG. 2 that the minter 10 is to become the G/O. Consequently, the first connecting unit 30 can determine the WFD channel value Vwfd to have a value that is identical to the non-WFD channel value Vap (S18 of FIG. 2), and therefore a multiple connection state can be formed appropriately. In general terms, regardless of whether the state of the wireless communication device is the parent station state or the child station state, in the case where the value of the first wireless channel and the value of the second wireless channel are not identical (i.e., the second case), the first connecting unit may change the setting value that the wireless communication device is storing from the first setting value to the second setting value.

(Variant 6) In the above embodiments, in the case where the WFD channel value Vwfd and the non-WFD channel value Vap are not identical, the first connecting unit 30 and the second connecting unit 32 form a single connection state in which only a non-WFD connection is established. Instead, in the case where the WFD channel value Vwfd and the non-WFD channel value Vap are not identical, the first connecting unit 30 and the second connecting unit 32 may form a single connection state in which only a WFD connection is established. In general terms, in the second case in which the value of the first wireless channel and the value of the second wireless channel are not identical, the first connecting unit and the second connecting unit may form a single connection state where only one particular connection of the first type of connection with the first device and the second type of connection with the second device is established.

(Variant 7) In the above embodiments, 1 ch to 14 ch is used as the range of the wireless channel value. This is the specification used in Japan. Instead, 1 ch to 11 ch (American specification) may be used, 1 ch to 13 ch may be used (European specification), or another range may be used as the range of the wireless channel value.

(Variant 8) In the above embodiments, the units 30 to 36 are realized by the CPU 22 of the printer 10 executing processes according to software. Instead, parts or entireties of the units 30 to 36 may be realized by hardware such as a logic circuit, etc.

What is claimed is:

1. A wireless communication device configured to operate selectively in one of a plurality of states comprising a parent station state which functions as a parent station of a wireless network and a child station state which functions as a child station of the wireless network, the wireless communication device comprising:
a processor; and
a memory storing computer-readable instructions therein, the computer-readable instructions, when executed by the processor, causing the wireless communication device to perform:
(A) executing a state determination process of determining that one of the wireless communication device and another device is to operate in the parent station state of a first wireless network and determining that the other of the wireless communication device and the other device is to operate in the child station state of a first wireless network, so as to establish a first type of connection with the other device such that the wireless communication device operates in a state determined in the state determination process, wherein in a case where the first type of connection with a first device is to be established, the first type of connection with the first device is established by using a first wireless channel; and
(B) establishing a second type of connection with another device such that the wireless communication device and the other device belong to a second wireless network different from the first wireless network, wherein in a case where the second type of connection with a second device different from the first device is to be established, the second type of connection with the second device is established by using a second wireless channel;
(C) judging in a specific situation whether a value of the first wireless channel and a value of the second wireless channel are identical or not, the specific situation being a situation in which one connection of the first type of connection with the first device and the second type of connection with the second device is to be established, while the other connection of the first type of connection with the first device and the second type of connection with the second device has been established;
wherein the above (A) and the above (B) include:
forming a multiple connection state in a first case where it is judged that the value of the first wireless channel and the value of the second wireless channel are identical, the multiple connection state being a state in which both the first type of connection with the first device and the second type of connection with the second device are established; and
forming a single connection state in a second case where it is judged that the value of the first wireless channel and the value of the second wireless channel are not identical, the single connection state being a state in which one particular connection is established, the one particular connection being one connection of the first type of connection with the first device and the second type of connection with the second device.

2. The wireless communication device as in claim 1, wherein
the one particular connection is the second type of connection with the second device.

3. The wireless communication device as in claim 1, wherein
the specific situation is a situation in which the second type of connection with the second device is to be established while the first type of connection with the first device has been established,
in the second case, the above (A) includes disconnecting the first type of connection with the first device which is currently established, and
in the second case, the above (B) includes establishing the second type of connection with the second device which is the one particular connection.

4. The wireless communication device as in claim 1, wherein
the above (A) and the above (B) include disconnecting the other connection which is currently established in the second case, so as to form the single connection state by establishing the one connection which is the one particular connection.

5. The wireless communication device as in claim 1, wherein
in the second case, the above (A) and the above (B) include disconnecting the other connection which is currently established by changing a value of a wireless channel which is currently used in the other connection to a value of a wireless channel which is to be used in the one connection, so as to form the single connection state by establishing the one connection which is the one particular connection.

6. The wireless communication device as in claim 1, wherein
in the specific situation in which the second type of connection with the second device is to be established while the first type of connection with the first device has been established:
in the second case, the above (A) includes disconnecting the first type of connection with the first device; and
in the second case, the above (B) includes establishing the second type of connection with the second device,
wherein in the specific situation in which the first type of connection with the first device is to be established while the second type of connection with the second device has been established:
in the second case, the above (A) includes not establishing the first type of connection with the first device; and
in the second case, the above (B) includes keeping the second type of connection with the second device.

7. The wireless communication device as in claim 1, wherein
the above (A) includes establishing the first type of connection with the first device in a situation in which the first type of connection with the first device is to be established while the second type of connection with the second device has not been established, and
the above (B) includes establishing the second type of connection with the second device in a situation in which the second type of connection with the second device is to be established while the first type of connection with the first device has not been established.

8. The wireless communication device as in claim 1, wherein
the second device is an access point.

9. The wireless communication device as in claim 3, wherein
in a situation in which the first type of connection with the first device is to be established while the second type of connection with the second device has not been established, the above (A) includes executing the state determination process by comparing a first setting value that the wireless communication device is storing with a setting value that the first device is storing, in the second ease, the above (A) further includes to change the first setting value that the wireless communication device is storing to a second setting value which is easier to be determined than the first setting value that the wireless communication device is to operate in the parent station state in the state determination process, and in the second case and in a situation in which the first type of connection with another device is to be established after disconnecting the first type of connection with the first device, the above (A) includes executing the state determination process by comparing the second setting value that the wireless communication device is storing with a setting value that the other device is storing.

10. The wireless communication device as in claim 3, wherein in the second case, the above (A) further includes setting a particular mode to keep the wireless communication device operating in the parent station state, and in the second case and in a situation in which the first type of connection with another device is to be established after disconnecting the first type of connection with the first device, the above (A) includes keeping the wireless communication device operating in the parent station state without executing the state determination process.

11. The wireless communication device as in claim 3, wherein in the second case, the above (A) includes disconnecting the first type of connection with the first device by changing the value of the first wireless channel which is currently used in the first type of connection with the first device to the value of the second wireless channel.

12. The wireless communication device as in claim 11, wherein the computer-readable instructions, when executed by the processor, cause the wireless communication device to further perform:

(D) notifying the first device of the value of the second wireless channel in the second case.

13. The wireless communication device as in claim 11, wherein in the second case and in a case where a current state of the wireless communication device is the parent station state, the above (A) includes disconnecting the first type of connection by changing the value of the first wireless channel which is currently used in the first type of connection with the first device to the value of the second wireless channel, and in the second case and in a case where the current state of the wireless communication device is the child station state, the above (A) includes disconnecting the first type of connection by changing a state of the wireless communication device from the child station state to a particular state different from the parent station state and the child station state.

14. The wireless communication device as in claim 8, wherein the value of the second wireless channel is a value determined by the access point.

15. A non-transitory computer-readable storage medium storing computer-readable instructions for a wireless communication device configured to operate selectively in one of a plurality of states comprising a parent station state which functions as a parent station of a wireless network and a child station state which functions as a child station of the wireless network, the computer-readable instructions, when executed by a processor of the wireless communication device, cause the wireless communication device to perform:

(A) executing a state determination process of determining that one of the wireless communication device and another device is to operate in the parent station state of a first wireless network and determining that the other of the wireless communication device and the other device is to operate in the child station state of a first wireless network, so as to establish a first type of connection with the other device such that the wireless communication device operates in a state determined in the state determination process, wherein in a case where the first type of connection with a first device is to be established, the first type of connection with the first device is established by using a first wireless channel; and (B) establishing a second type of connection with another device such that the wireless communication device and the other device belong to a second wireless network different from the first wireless network, wherein in a case where the second type of connection with a second device different from the first device is to be established, the second type of connection with the second device is established by using a second wireless channel;

(C) judging in a specific situation whether a value of the first wireless channel and a value of the second wireless channel are identical or not, the specific situation being a situation in which one connection of the first type of connection with the first device and the second type of connection with the second device is to be established, while the other connection of the first type of connection with the first device and the second type of connection with the second device has been established;

wherein the above (A) and the above (B) include:

forming a multiple connection state in a first case where it is judged that the value of the first wireless channel and the value of the second wireless channel are identical, the multiple connection state being a state in which both the first type of connection with the first device and the second type of connection with the second device are established; and forming a single connection state in a second case where it is judged that the value of the first wireless channel and the value of the second wireless channel are not identical, the single connection state being a state in which one particular connection is established, the one particular connection being one connection of the first type of connection with the first device and the second type of connection with the second device.

16. A wireless communication device comprising:

a processor; and a memory storing computer-readable instructions therein, the computer-readable instructions, when executed by the processor, causing the wireless communication device to perform:

establishing, in a case where a first type of connection with a first device is to be established when a second type of connection with an access point different from the first device is not established, the first type of connection with the first device using a first wireless channel such that the wireless communication device and the first device belong to a first wireless network;

establishing, in a case where the second type of connection with the access point is to be established when the first type of connection with the first device is not established, the second type of connection with the access point using a second wireless channel such that the wireless communication device and the access point belong to a second wireless network different from the first wireless network, a value of the second wireless channel being a value determined by the access point, in a case where a value of the first wireless channel and the value of the second wireless channel are not identical under a situation in which the second type of connection with the access point is to be established, when the first type of connection with the first device has been established, disconnecting the first type of connection with the first device which is currently established; and establishing the second type of connection with the access point.

17. The wireless communication device as in claim 16, wherein the disconnecting of the first type of connection with the first device is performed by changing the value of the first wireless channel which is currently used in the first type of connection with the first device to the value of the second wireless channel.

18. The wireless communication device as in claim 16, wherein the computer-readable instructions, when executed by the processor, causing the wireless communication device to further perform:

keeping, in a case where the value of the first wireless channel and the value of the second wireless channel are not identical under a situation in which the first type of connection with the first device is to be established, when the second type of connection with the access point has been established, the second type of connection with the access point without establishing the first type of connection with the first device.

19. The wireless communication device as in claim 16, the computer-readable instructions, when executed by the processor, causing the wireless communication device to further perform:

in a case where the value of the first wireless channel and the value of the second wireless channel are identical under the situation in which the second type of connection with the access point is to be established, when the first type of connection with the first device has been established, keeping the first type of connection with the first device; and establishing the second type of connection with the access point.

20. The wireless communication device as in claim 16, wherein the computer-readable instructions, when executed by the processor, cause the wireless communication device to further perform:

judging, in the situation in which the second type of connection with the access point is to be established, when the first type of connection with the first device has been established, whether the value of the first wireless channel and the value of the second wireless channel are identical or not, wherein in the case where it is judged that the value of the first wireless channel and the value of the second wireless channel are not identical, the disconnecting of the first type of connection with the first device is performed; and the establishing of the second type of connection with the access point is performed.

21. The wireless communication device as in claim 16, configured to operate selectively in one of a plurality of states comprising a parent station state which functions as a parent station of a wireless network, wherein the first type of connection with the first device is established such that the wireless communication device operates in the parent station state, the value of the first wireless channel being a value determined by the wireless communication device operating in the parent station state.

* * * * *